United States Patent
Heinze et al.

(10) Patent No.: US 12,428,705 B2
(45) Date of Patent: Sep. 30, 2025

(54) NICKEL-BASED ALLOY, POWDER, METHOD AND COMPONENT

(71) Applicant: Siemens Energy Global GmbH & Co. KG, Munich (DE)

(72) Inventors: Christoph Heinze, Markkleeberg (DE); Yves Küsters, Berlin (DE); Michael Ott, Mülheim an der Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 469 days.

(21) Appl. No.: 18/009,417

(22) PCT Filed: Jun. 17, 2021

(86) PCT No.: PCT/EP2021/066388
§ 371 (c)(1),
(2) Date: Dec. 9, 2022

(87) PCT Pub. No.: WO2021/259750
PCT Pub. Date: Dec. 30, 2021

(65) Prior Publication Data
US 2023/0220518 A1 Jul. 13, 2023

(30) Foreign Application Priority Data
Jun. 25, 2020 (DE) .................... 10 2020 207 910.2

(51) Int. Cl.
*C22C 1/04* (2023.01)
*B22F 10/28* (2021.01)
*C22C 19/05* (2006.01)
*B33Y 10/00* (2015.01)
*B33Y 70/00* (2020.01)
*B33Y 80/00* (2015.01)

(52) U.S. Cl.
CPC ............ *C22C 19/056* (2013.01); *B22F 10/28* (2021.01); *C22C 1/0433* (2013.01); *C22C 19/057* (2013.01); *B22F 2301/15* (2013.01); *B33Y 10/00* (2014.12); *B33Y 70/00* (2014.12); *B33Y 80/00* (2014.12)

(58) Field of Classification Search
CPC ............................ C22C 19/057; C22C 1/0433
See application file for complete search history.

(56) References Cited

U.S. PATENT DOCUMENTS

| | | |
|---|---|---|
| 4,061,495 A | 12/1977 | Selman |
| 11,193,186 B2 | 12/2021 | Kiese |
| 2009/0123690 A1 | 5/2009 | Scholl |
| 2012/0273468 A1 | 11/2012 | Arjakine |
| 2013/0228302 A1 | 9/2013 | Rickenbacher |
| 2014/0191017 A1 | 7/2014 | Arjakine et al. |
| 2018/0002785 A1 | 1/2018 | Dial |
| 2019/0249277 A1 | 8/2019 | Hasselqvist |

FOREIGN PATENT DOCUMENTS

| | | |
|---|---|---|
| CN | 102596485 A | 7/2012 |
| CN | 103084573 A | 5/2013 |
| CN | 103702793 A | 4/2014 |
| CN | 110303163 A | 10/2019 |
| DE | 2530245 A1 | 1/1976 |
| DE | 102005001198 A1 | 7/2006 |
| DE | 102017113780 A1 | 1/2018 |
| DE | 102016221470 A1 | 5/2018 |
| DE | 102017007106 B4 | 3/2020 |
| EP | 3034639 A1 | 6/2016 |
| WO | 2018083065 A1 | 5/2018 |
| WO | 2021259750 A1 | 12/2021 |

OTHER PUBLICATIONS

PCT International Search Report and Written Opinion of International Searching Authority mailed Oct. 11, 2021 corresponding to PCT International Application No. PCT/EP2021/066388 filed Jun. 17, 2021.
Wang, Xiqian et al: "Microstructure and yield strength of SLM-fabricated CM247LC Ni-Superalloy"; Acta Materialia, Elsevier, Oxford, GB; vol. 128, Feb. 7, 2017 (Feb. 7, 2017), pp. 87-95, XP029944500.
Catchpole, S. Smith et al: "Fractal scan strategies for selective laser melting of 'unweldable' nickel superalloys"; Additive Manufacturing, vol. 15, May 1, 2017 (May 1, 2017), pp. 113-122, XP055559354.

*Primary Examiner* — Jessee R Roe
(74) *Attorney, Agent, or Firm* — Wolter Van Dyke Davis, PLLC

(57) ABSTRACT

A nickel-based alloy which includes at least the following alloy elements in wt. %: cobalt (Co) 10.3-10.7, chromium (Cr) 9.8-10.2, tungsten (W) 9.3-9.7, aluminum (Al) 5.2-5.7, hafnium (Hf) 1.8-2.2, tantalum (Ta) 1.9-2.1, molybdenum (Mo) 0.4-0.6, the remainder being nickel and impurities.

16 Claims, No Drawings

NICKEL-BASED ALLOY, POWDER, METHOD AND COMPONENT

CROSS REFERENCE TO RELATED APPLICATIONS

This application is the US National Stage of International Application No. PCT/EP2021/066388 filed 17 Jun. 2021, and claims the benefit thereof. The International Application claims the benefit of German Application No. DE 10 2020 207 910.2 filed 25 Jun. 2020. All of the applications are incorporated by reference herein in their entirety.

FIELD OF INVENTION

The invention relates to a nickel-based alloy, to a powder, and also to a method and a component as claimed.

BACKGROUND OF INVENTION

Nickel-based alloys feature high corrosion resistance and high thermal stability, more particularly a high creep strength at high temperatures. Alloys featuring the latter properties are also referred to as nickel-based superalloys. These alloys are employed in particular in jet engine construction or in turbines for power generation. In general, the components consisting of the nickel-based alloys described are produced by a casting process or by sintering processes. One example of such an alloy is given in DE 10 2017 007 106 B4.

Increasingly, though, additive manufacturing processes are also being employed, using nickel-based alloy. One alloy highly suited to such processes is described in WO2018/083065A1. On the basis of that alloy, the object of the invention is to further increase the creep resistance while maintaining the microcracking at a low level or even reducing it further.

SUMMARY OF INVENTION

The achievement of the object lies in a nickel-based alloy, and also in a powder, in a method, and in a component as claimed.

DETAILED DESCRIPTION OF INVENTION

This nickel-based alloy of the invention has at least the following alloy elements in wt %:
cobalt (Co) 10.3-10.7,
chromium (Cr) 9.8-10.2,
tungsten (W) 9.3-9.7,
aluminum (Al) 5.2-5.7,
hafnium (Hf) 1.8-2.2,
tantalum (Ta) 1.9-2.1,
molybdenum (Mo) 0.4-0.6,
the balance comprising nickel and impurities.

The present alloy differs from the above-described prior art in particular in that the fraction of hafnium has been increased to an extent that it is now between 1.8 and 2.2 percent by weight. As a result of this, the propensity of the alloy to exhibit solidification cracking has been markedly reduced or, with adaptation of the operating parameters, has been prevented entirely. The targeted increase in the fraction of hafnium also improves the mechanical properties, as a result of the increase in the fraction of what are called r phases, in contrast to alloys having a lower fraction of hafnium. The fraction of tantalum as well is situated in a slightly increased range relative to the prior art.

In one embodiment of the invention, the respective fraction of the alloy elements is indicated once again in a narrower percentage range, and encompassed at least as follows:
cobalt (Co) 10.55-10.65,
chromium (Cr) 9.8-10.9,
tungsten (W) 9.35-9.45,
aluminum (Al) 5.35-5.45,
hafnium (Hf) 1.85-1.95,
tantalum (Ta) 1.95-2.05,
molybdenum (Mo) 0.4-0.6,
the balance comprising nickel and impurities.

Also situated within this narrower range is one specific alloy composition which is tested as particularly advantageous. Following measurement of the composition, it has the following individual fractions of the corresponding alloy constituents:
cobalt (Co) 10.6,
chromium (Cr) 9.8,
tungsten (W) 9.4,
aluminum (Al) 5.4,
hafnium (Hf) 1.9,
tantalum (Ta) 2.0,
molybdenum (Mo) 0.5,
carbon (C) 0.06,
the balance being nickel and impurities.

With this specific alloy, it has emerged that the propensity toward microcracks is particularly low and there is a high-temperature creep strength which is significantly improved over the prior art.

The alloy compositions described so far are formulated such that as well as the impurities there may also be further constituents present to a small extent. In this context it has emerged as being advantageous to select a carbon fraction which in percent by weight terms is between 0.04 and 0.08.

It is useful, furthermore, for the alloy to comprise boron and/or zirconium in small constituent parts, which are advantageously between 0.0025 and 0.01 percent by weight.

The fractions of further alloy constituents of minor significance, which may also be regarded as impurities, specifically silicon, manganese, phosphorus, sulfur, titanium, boron, zirconium, iron, copper, silver, lead, selenium, bismuth and magnesium, ought in each case to be less than 0.1 wt %. More particularly, less than 0.05 wt %; in the case of silicon, advantageously less than 0.02 wt %.

A further constituent of the invention is a powder which comprises an alloy as claimed. The term "comprises" thus means that this powder consists substantially of the stated alloy, but that it may also feature additives which positively influence an additive manufacturing process. These may be certain binders or release agents. This means that not only the alloy itself but also the powder resulting therefrom may be used in particular for producing components by an additive manufacturing process.

In this context, a further constituent of the invention is a method for producing a component, which takes place using an alloy or a powder as claimed. This method is advantageously an additive manufacturing method, more particularly a laser sintering method or a selective laser melting method, e.g., LPBF.

A further constituent of the invention is a component which comprises an alloy or a powder as claimed, with the component consisting of this alloy if minor additives are disregarded. The term "component" here also comprehends an intermediate product, which through further method steps may be integrated into another component and therefore in the final assembly state may also feature other constituent materials.

Particularly advantageous is the use of the alloy, the powder of the method and hence also the component in turbines which serve for the generation of electrical power. More particularly, in gas turbine components. In principle, the invention may also find application in turbines which are used to propel means of transport, including, more particularly, in aircraft turbines.

The invention claimed is:

1. A nickel-based alloy comprising at least the following alloy elements in wt %:
   cobalt (Co) 10.3-10.7,
   chromium (Cr) 9.8-10.2,
   tungsten (W) 9.3-9.7,
   aluminum (Al) 5.2-5.7,
   hafnium (Hf) 1.8-2.2,
   tantalum (Ta) 1.9-2.1,
   molybdenum (Mo) 0.4-0.6,
   the balance comprising nickel and impurities.

2. A component, comprising:
   an alloy as claimed in claim 1.

3. A component, consisting of:
   an alloy as claimed in claim 1.

4. The nickel-based alloy as claimed in claim 1, comprising at least the following alloy elements in wt %:
   cobalt (Co) 10.55-10.65,
   chromium (Cr) 9.8-10.9,
   tungsten (W) 9.35-9.45,
   aluminum (Al) 5.35-5.45,
   hafnium (Hf) 1.85-1.95,
   tantalum (Ta) 1.95-2.05,
   molybdenum (Mo) 0.40-0.6,
   the balance comprising nickel and impurities.

5. The nickel-based alloy as claimed in claim 1, comprising at least the following alloy elements in wt %:
   cobalt (Co) 10.6,
   chromium (Cr) 9.8,
   tungsten (W) 9.4,
   aluminum (Al) 5.4,
   hafnium (Hf) 1.9,
   tantalum (Ta) 2.0,
   molybdenum (Mo) 0.5,
   carbon (C) 0.06,
   the balance comprising nickel and impurities.

6. The nickel-based alloy as claimed in claim 1, wherein the alloy additionally comprises carbon (C) with a fraction of between 0.04 and 0.08 wt %.

7. The nickel-based alloy as claimed in claim 1, wherein the alloy additionally comprises boron (B) and/or zirconium (Zr) with a fraction of between 0.0025 and 0.01 wt %.

8. The nickel-based alloy as claimed in claim 1, wherein the fractions of silicon, manganese, phosphorus, sulfur, titanium, boron, zirconium, iron, copper, silver, lead, selenium, bismuth and magnesium are each less than 0.1 wt %.

9. The nickel-based alloy as claimed in claim 8, wherein the fractions of silicon, manganese, phosphorus, sulfur, titanium, boron, zirconium, iron, copper, silver, lead, selenium, bismuth and magnesium are each less than 0.05 wt %.

10. The nickel-based alloy as claimed in claim 8, wherein the fractions of silicon, manganese, phosphorus, sulfur, titanium, boron, zirconium, iron, copper, silver, lead, selenium, bismuth and magnesium are each less than 0.05 wt %, and in the case of silicon is less than 0.02 wt %.

11. A powder, comprising:
    an alloy as claimed in claim 1.

12. A component produced from a powder as claimed in claim 11.

13. The powder as claimed in claim 11, comprising:
    additives for additive manufacturing.

14. A method for producing a component, comprising:
    using an alloy as claimed in claim 1.

15. The method as claimed in claim 14, wherein the method is an additive manufacturing method.

16. The method as claimed in claim 15, wherein the method is a selective laser sintering or a selective laser melting.

* * * * *